3,455,694
**PROCESS FOR THE PREPARATION OF PHOTO-
GRAPHIC SILVER HALIDE EMULSIONS BY
THE FLOCCULATION METHOD**
Walter Anderau, Marly-le-Grand, and Heinrich Schaller,
Fribourg, Switzerland, assignors to Ciba Limited, Basel,
Switzerland, a Swiss company
No Drawing. Filed June 8, 1966, Ser. No. 555,995
Claims priority, application Switzerland, June 15, 1965,
8,311/65
Int. Cl. G03c 1/02
U.S. Cl. 96—94                                                              9 Claims

ABSTRACT OF THE DISCLOSURE

A process for the preparation of silver halide emulsions by the flocculation method using as the flocculating agent the condensation product of

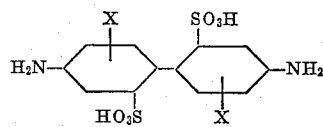

in which X is selected from the group consisting of a hydrogen atom and a methyl radical, with a thiophene-2,5-dicarboxylic acid dihalide in a molecular ratio of 1:2 to 2:1.

--- phenylsulphonic acids with thiophene-2,5-dicarboxylic acid dihalides in a molecular ratio of 1:2 to 2:1.

Preferred compounds are those obtained by condensing compounds of the formula (1)

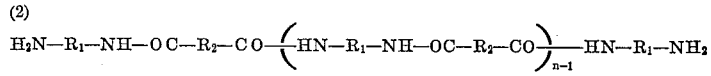

in which X represents a methyl group or especially a hydrogen atom, with thiophene-2,5-dicarboxylic acid dihalides.

The compounds obtainable by this process are new and probably correspond to the formula (2)

$$H_2N-R_1-NH-OC-R_2-CO-\left(HN-R_1-NH-OC-R_2-CO\right)_{n-1}-HN-R_1-NH_2$$

in which $R_1$ represents a diphenyl radical, in which a sulphonic acid group is attached to each benzene nucleus, and which is bound to the nitrogen atoms in 4-position and 4'-position, $R_2$ represents a thiophene radical bound to the —CO groups in 2-position and 5-position and $n$ represents an integer not greater than 3.

Preferred compounds are those corresponding to the probable formula

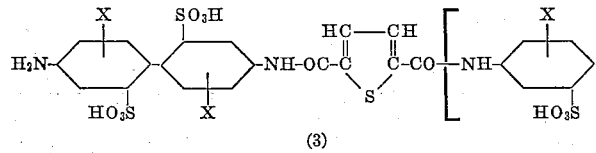 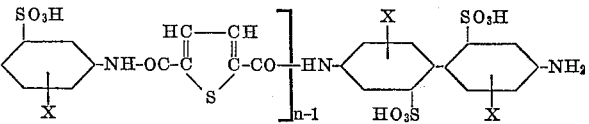

(3)

in which X represents a hydrogen atom or a methyl group and $n$ represents an integer not greater than 3, especially those of the Formula 3, in which X represents a hydrogen atom and which thus correspond to the probable Formula 4

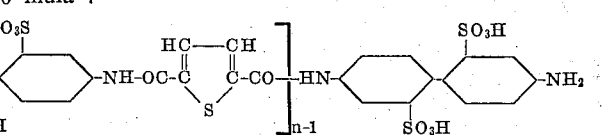

The present invention relates to a process for the preparation of photographic silver halide emulsions by the flocculation method.

It is known that extraneous water-soluble salts, especially alkali nitrates, have to be removed in the preparation of photographic silver halide emulsions. Removal by flocculation has considerable advantages over other methods. In this method of working, the silver halide emulsion is precipitated, isolated from the supernatant solution, which contains salt, and again dispersed in a gelatine solution or some other suitable layer colloid.

The present invention is based on the observation that certain derivatives of 2,5-thiophene-dicarboxylic acid are especially suitable as flocculating agents. Accordingly, the present invention provides a process for the preparation of photographic silver halide emulsions by the flocculating method, wherein the flocculating agents used are compounds that are obtained by condensing diaminodiin which $n$ has the meaning given above. The molecular ratio of the starting materials may vary as required between 1:2 and 2:1 and need not be integral in that it is also possible to use mixtures of compounds of the probable Formula 2 in which $n$ has different values.

As examples of starting materials for these condensation processes there may be mentioned, on the one hand, 3,3' - dimethyl - 4,4' - diaminodiphenyl-(1,1')-2,2'-disulphonic acid, 4,4'-diaminodiphenyl-(1,1')-2,2'-disulphonic acid and 4,4-diaminodiphenyl - (1,1') - 3,3' - disulphonic acid, and on the other hand, thiophene-2,5-dicarboxylic acid dichloride.

Condensation may be carried out in an aqueous medium, advantageously in the presence of an agent capable of binding acid, in a manner such that the pH value of the reaction medium does not drop below 7. It is also advantageous to add acid chloride, dissolved in an organic solvent miscible with water, for example, acetone, to the reaction mixture.

The compounds of the invention may be used in the usual manner as flocculating agents. It is generally advantageous to effect flocculation by adding an aqueous solution of the flocculating agent to the emulsion, in which process the pH of the emulsion is first adjusted to the required value, or the pH can subsequently be adjusted should such adjustment be necessary. The silver halide precipitates together with the gelatine in the form of fine grains and settles out very quickly. The precipitates contain only a small amount of water, so that, in some cases, it is not necessary to wash them further. Should it appear necessary, the precipitates can be washed once or several times with cold water, to which a small amount of potassium or sodium nitrate is added to effect better separation. When so doing, it is advantageous first to stir the precipitate with water only and then to add the nitrate prior to the precipitate settling.

It is a special advantage of the process of the invention that the flocculating agents used are, to a large extent, independent of the pH of the emulsion. For example, boiling emulsions can be precipitated as they are at their own pH values between 3 and 7, and ammonia emulsions can be precipitated at pH values between 7 and 9. However, the working conditions as such, for example, the amount of flocculating agent used, which may, for example, be 10 to 200% (based on the dry gelatine), depend not only on the specific flocculating agent used, but also on the gelatine concentration of the emulsion, the salt content, and other factors. The temperature at which flocculation is carried out is not critical, and is generally in the range of from 30 to 50° C.

Silver halide emulsions of all kinds can be prepared by the process of the present invention, especially emulsions for coloured photographic materials which contain either colour components for chromogenic development or image dyestuffs for the silver dyestuff bleaching process.

The following methods of preparation and examples illustrate the invention. Unless otherwise stated, the parts and percentages are by weight.

METHODS OF PREPARATION.—
CONDENSATION PRODUCT A 34.4 parts of free 4,4'-diaminodiphenyl(-1,1')-2,2'-disulphonic acid and 20 parts by volume of 30% sodium hydroxide solution are stirred in 300 parts of water having a temperature of 25° C. to produce a solution of the disodium salt. 40 parts of sodium tetraborate crystals are added to the solution and, when the crystals have dissolved, a solution of 11 parts of thiophene-2,5-dicarboxylic acid dichloride in 25 parts of acetone is added in portions. The batch is stirred for 16 to 20 hours. After condensation, the pH value must be at least 7; a small amount of sodium carbonate is added if it is lower. The reaction mixture is then heated to 45° C., 225 parts of saturated potassium acetate solution are added and the batch is stirred for a further 10 to 12 hours. A somewhat gelatinous precipitate forms which is isolated by filtration. The precipitate is suspended in 400 parts of ethanol, the suspension is stirred for a further hour and then filtered. Drying is effected at 70° C., and about 60 parts of a whitish powder giving a practically neutral solution in water are obtained.

CONDENSATION PRODUCT B 80 parts of condensation product A, which is in the form of a potassium salt, are dissolved at 24 to 30° C. in 1,000 parts of water, and 40 parts of sodium tetraborate crystals are added. A solution of 11 parts of thiophene-2, 5-dicarboxylic acid dichloride in 40 parts of acetone is added and the batch is stirred for 24 hours at 20 to 25° C. The batch is heated to 50 to 60° C., 50 parts of potassium acetate are added, and the whole is then allowed to cool while stirring. The batch is filtered at 20° C., and the precipitate is washed with ethanol and dried.

CONDENSATION PRODUCT C 20 parts of volume of 30% sodium hydroxide solution are added to 37.2 parts of 3,3'-dimethyl-4,4'-diaminodiphenyl-(1,1')-2,2'-disulphonic acid (in the form of the free acid) in 320 parts of water having a temperature of 25° C. The pH of the solution so obtained is adjusted to 7 and then 40 parts of sodium tetraborate crystals are added. 11 parts of thiophene-2,5-dicarboxylic acid dichloride, dissolved in 25 to 30 parts of acetone, are added at a temperature of 25 to 30° C. The batch is stirred for 16 to 20 hours. The pH value must not drop below 7; 2 to 3 parts of 30% sodium hydroxide solution are added if it is lower. The condensation product is heated to 55° C., and then 250 parts of 7 N potassium acetate solution are added. The batch is stirred for 10 hours, during which period the temperature must drop to 18° C. The precipitate is isolated by filtration and to it are added 400 parts of ethanol. The suspension is stirred for 1 hour at 25° C. and the condensation product is isolated by filtration. It is dried in vacuo at 70° C.

A white powder is obtained which gives a practically neutral, clear solution in water.

CONDENSATION PRODUCT D

The same procedure is adopted as for condensation product A, except that 34.4 parts of 4,4'-diaminodiphenyl-(1,1')-3,3'-disulphonic acid are used instead of 4,4'-diaminodiphenyl-(1,1')-2,2'-disulphonic acid, and the 40 parts of sodium tetraborate are replaced by 60 parts of sodium bicarbonate.

Example 1

A solution of 60 parts of silver nitrate in 600 parts of water is added at 50° C. in the course of 15 minutes to a solution of 8 parts of gelatine, 44 parts of potassium bromide and 1 part of potassium iodide in 600 parts of water. The batch is allowed to ripen for 10 minutes at 50° C. and is then cooled to 40° C. 40 parts by volume of a 5% aqueous solution of condensation product A are then added. The pH value of the emulsion is 6. The silver halide precipitates together with the gelatine in the form of finely divided grains and settles out very quickly. The supernatant solution, which contains salt, is decanted. A solution of 120 parts of gelatine in 1,400 parts of water, which solution has a temperature of 40° C., is added to the precipitate. After stirring for 10 to 20 minutes at 40° C., the silver halide is again dispersed and the batch is allowed to ripen to optimum sensitivity in known manner at 50 to 55° C.

Condensation products B, C and D can be used with equal success as flocculating agents instead of condensation product A.

Example 2

A solution of 100 parts of silver nitrate and 100 parts by volume of ammonia (density 0.91) in 400 parts of water is added in the course of 25 minutes to a solution of 10 parts of gelatine, 100 parts of potassium bromide and 2 parts of potassium iodide in 300 parts of water. The batch is allowed to ripen for 10 minutes at 45° C. and then cooled to 30° C. The pH value of the emulsion is adjusted to 8 to 9 by the addition of 20% sulphuric acid, and 50 parts by volume of a 5% solution of condensation product A are added. The silver halide precipitates together with the gelatine in the form of grains and settles out rapidly. The supernatant solution is decanted and the coagulate is washed once or twice with cold water.

A solution of 90 grams of gelatine in 900 parts of water is then added and the pH is adjusted to 7.0. After stirring for 10 to 20 minutes at 40° C., the silver halide is again dispersed and the emulsion is allowed to ripen to optimum sensitivity in known manner at 50 to 60° C.

Condensation products B, C and D can be used with equal success as flocculating agents instead of condensation product A.

What is claimed is:

1. A process for the preparation of photographic silver halide emulsions by the flocculation method, wherein the flocculating agents used are compounds that are obtained by condensing a diaminodiphenyl-sulphonic acid with a thiophene-2,5-dicarboxylic acid dihalide in a molecular ratio of 1:2 to 2:1.

2. A process for the preparation of photographic silver halide emulsions by the flocculation method according to claim 1, which comprises using as flocculating agent a compound that is obtained by condensing a compound of the formula

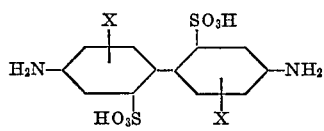

in which X represents a member selected from the group consisting of a methyl radical and a hydrogen atom, with a thiophene-2,5-dicarboxylic acid dihalide in a molecular ratio of 1:2 to 2:1.

3. A process for the preparation of photographic silver halide emulsions by the flocculation method according to claim 1, which comprises using as flocculating agent a compound that is obtained by condensing 3,3'-dimethyl-4,4'-diaminodiphenyl-(1,1')-2,2'-disulfonic acid with a thiophene 2,5-dicarboxylic acid dihalide in a molecular ratio of 1:2 to 2:1.

4. A process for the preparation of photographic silver halid emulsions by the flocculation method according to claim 1, which comprises using as flocculating agent a compound that is obtained by condensing 4,4'-diaminodiphenyl-(1,1')-2,2'-disulfonic acid with a thiophene-2,5-dicarboxylic acid dihalide.

5. A process for the preparation of photographic silver halide emulsions by the flocculation method according to claim 1, which comprising using as flocculating agent a compound that is obtained by condensing 4,4'-diaminodiphenyl-(1,1')-3,3'-disulfonic acid with a thiophene-2,5-dicarboxylic acid dihalide in a molecular ratio of 1:2 to 2:1.

6. A process for the preparation of photographic silver halide emulsions by the flocculation method according to claim 1, which comprises using as flocculating agent a compound that is obtained by condensing 4,4'-diaminodiphenyl-(1,1')-2,2'-disulfonic acid with a thiophene-2,5-dicarboxylic acid dichloride in a molecular ratio of 1:2 to 2:1.

7. A process for the preparation of photographic silver halide emulsions by the flocculation method according to claim 1, which comprises using as flocculating agent a compound that is obtained by condensing a compound of the formula

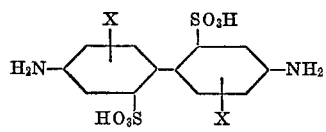

in which X represents a member selected from the group consisting of a methyl radical and a hydrogen atom, with a thiophene-2,5-dicarboxylic acid dihalide in a molecular ratio of 1:2 to 2:1, the condensation being carried out in an aqueous medium in the presence of an agent capable of binding acid.

8. A process for the preparation of photographic silver halide emulsions by the flocculation method according to claim 1, which comprises using as flocculating agent a compound that is obtained by condensing a compound of the formula

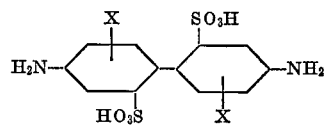

in which X represents a member selected from the group consisting of a methyl radical and a hydrogen atom, with a thiophene-2,4-dicarboxylic acid dihalide in a molecular ratio of 1:2 to 2:1, the flocculation being carried out at a temperature within the range of from 30 to 50° C.

9. A process for the preparation of photographic silver halide emulsions by the flocculation method according to claim 1, which comprises using as flocculating agent a compound that is obtained by condensing a compound of the formula

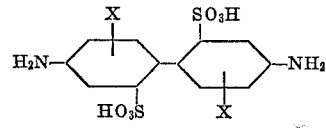

in which X represents a member selected from the group consisting of a methyl radical and a hydrogen atom, with a thiophene-2,5-dicarboxylic acid dihalide in a molecular ratio of 1:2 to 2:1, the amount of flocculating agent used being within the range of from 10 to 200% by weight, based on the dry gelatine.

References Cited

UNITED STATES PATENTS

| 3,178,294 | 4/1965 | Kinkel et al. | 96—94 |
| 3,366,482 | 1/1968 | Schaller et al. | 96—94 |

FOREIGN PATENTS

| 1,145,485 | 3/1963 | Germany. |

NORMAN G. TORCHIN, Primary Examiner

MARY F. KELLEY, Assistant Examiner

CASE TEL-23/E

PO-1050
(5/69)

UNITED STATES PATENT OFFICE
CERTIFICATE OF CORRECTION

Patent No. 3,455,694                  Dated July 15, 1969

Inventor(s) WALTER ANDERAU ET AL

It is certified that error appears in the above-identified patent and that said Letters Patent are hereby corrected as shown below:

Column 5, line 45, after "claim 1, which" delete "comprising" and substitute --- comprises ---.

Column 6, line 27, after "a thiophene-2," delete "4" and substitute --- 5 ---.

SIGNED AND
SEALED
DEC 8 - 1970

(SEAL)
Attest:

Edward M. Fletcher, Jr.
Attesting Officer

WILLIAM E. SCHUYLER, JR.
Commissioner of Patents